(12) United States Patent
Mott

(10) Patent No.: US 6,841,023 B2
(45) Date of Patent: Jan. 11, 2005

(54) PROCESS FOR THE MANUFACTURING OF AN IMPROVED CORE FOR DECORATIVE LAMINATES AND A DECORATIVE LAMINATE OBTAINED BY THE PROCESS

(75) Inventor: Laurence Mott, Trelleborg (SE)

(73) Assignee: Pergo (Europe) AB, Trelleborg (SE)

( * ) Notice: Subject to any disclaimer, the term of this patent is extended or adjusted under 35 U.S.C. 154(b) by 159 days.

(21) Appl. No.: 10/078,407

(22) Filed: Feb. 21, 2002

(65) Prior Publication Data

US 2002/0096255 A1 Jul. 25, 2002

Related U.S. Application Data

(60) Provisional application No. 60/269,850, filed on Feb. 21, 2001.

(51) Int. Cl.⁷ ................................................. B32B 5/18
(52) U.S. Cl. .................... 156/244.16; 156/78; 156/245; 156/250; 156/583.5; 264/122; 264/128
(58) Field of Search ................................ 156/62.2, 242, 156/244.16, 244.27, 245, 250, 583.5, 78; 264/122, 128

(56) References Cited

U.S. PATENT DOCUMENTS

| | | |
|---|---|---|
| 3,996,154 A | 12/1976 | Johnson et al. |
| 5,348,778 A | 9/1994 | Knipp et al. |
| 6,093,481 A | 7/2000 | Lynn et al. |
| 6,106,654 A | 8/2000 | Velin et al. |
| 6,421,970 B1 | 7/2002 | Martensson et al. |
| 6,588,166 B2 | 7/2003 | Martensson et al. |
| 6,761,794 B2 | 7/2004 | Mott et al. |
| 2002/0007899 A1 | 1/2002 | Mott et al. |

OTHER PUBLICATIONS

U.S. application No. 10/839,204, filed May 6, 2004.

Primary Examiner—Sam Chuan Yao
(74) Attorney, Agent, or Firm—Stevens, Davis, Miller & Mosher, L.L.P.

(57) ABSTRACT

A process for the manufacturing of a core forming a carrying structure for decorative laminates. The core comprises particles of cured, and optionally foamed, rigid, polyurethane, polyisocyanurate and/or phenolic resin. The particles are bonded to each other in a pressing procedure with a bonding agent comprising an adhesive such as a polymerizing monomer.

i) The particles are achieved by grinding cured, and optionally foamed, rigid, polyurethane, polyisocyanurate and/or phenolic resin so that it passes through a 2 mm screen, preferably a 1 mm screen, ii) 100 parts per weight of particles is mixed with 1–100 parts per weight of fiber, the fiber additive having an average length in the range 1–15 mm.

iii) The particle-fiber mixture is allowed to absorb a selected amount of water, the amount of water being in the range 1–15% by weight, The water is either added at any stage before the adding of bonding agent, and/or being used as a solvent in the bonding agent, and that, iv) 85 parts per weight of the particle mixture is mixed with 2–15 parts per weight of a bonding agent, the bonding agent selected from the group consisting of, a) A mixture of polyols, such as polyester or polyether, crude methylene diphenyl diisocyanate and possibly a small amount of blowing agent in a ratio forming a polymeric resin with a density in the range 600–1400 $kg/m^3$.

b) A formaldehyde based resin such as phenol-formaldehyde resin, urea-formaldehyde resin, melamine-urea-formaldehyde resin, melamine-urea-phenol-formaldehyde resin or phenol-resorcinol-formaldehyde resin, or c) Polyvinyl acetate resin.

v) The mixture is applied between the belts of the continuos belt press or the press plates of a static press, optionally with at least one intermediate carrier web, the belts or press plates allowing a mainly uniform and specified material thickness to form. A slightly porous and preconditioned core with a selected water content in the range 0.8–12% is hereby achieved. The invention also relates to a decorative laminate achieved through the process.

51 Claims, No Drawings

PROCESS FOR THE MANUFACTURING OF AN IMPROVED CORE FOR DECORATIVE LAMINATES AND A DECORATIVE LAMINATE OBTAINED BY THE PROCESS

CROSS-REFERENCE TO RELATED APPLICATIONS

This application claims priority of U.S. Provisional application No. 60/269,850, filed on Feb. 21, 2001, the entire disclosure of which is incorporated herein by reference.

BACKGROUND OF THE INVENTION

1. Field of the Invention

The present invention relates to a process for manufacturing a board used as a core in decorative laminates and a decorative laminate obtained by the process.

2. Description of the Related Art

Products clad with thermosetting laminates are quite common nowadays. They are most often used where the demand for abrasion resistance is great but also where resistance towards different chemical substances and moisture is required. Floors, floor skirtings, work tops, table tops, doors and wall panels can serve as an example of such products. The thermosetting laminate is most often made from a number of base sheets and a decorative sheet placed closest to the surface. The decorative sheet may be provided with the desired décor or pattern. Thicker laminates are often provided with a core of particle board or fiber board where both sides are covered with sheets of thermosetting laminate. The outermost sheet is, on at least one side, most often a decorative sheet.

One problem with such thicker laminates is that the core is much softer than the surface layer which is made from paper impregnated with thermosetting resin. This will cause a considerably reduced resistance towards thrusts and blows compared to a laminate with a corresponding thickness made of paper impregnated with thermosetting resin only.

Another problem with thicker laminates with a core of particle board or fiber board is that these normally will absorb a large amount of moisture, which will cause them to expand and soften whereby the laminate will warp. The surface layer might even, partly or completely come off in extreme cases since the core will expand more than the surface layer. This type of laminate can therefore not be used in humid areas, such as bath rooms or kitchens, without problem.

The problems can be partly solved by making the core of paper impregnated with thermosetting resin as well. Such a laminate is most often called compact laminate. These compact laminates are, however, very expensive and laborious to obtain as several tens of layers of paper have to be impregnated, dried and put in layers. The direction of the fiber in the paper does furthermore cause a moisture and temperature difference relating expansion. This expansion is two to three times as high in the direction crossing the fiber than along the fiber. The longitudinal direction of the fiber is coinciding with the longitudinal direction of the paper. One will furthermore be restricted to use cellulose as a base in the manufacturing though other materials could prove suitable.

It is known to manufacture boards of recycled rigid polyurethane foam particles bonded by using MDI as a glue. These polyurethane particle boards are, however, not suited as cores in laminates such as the ones described above since the particles normally will expand when heated. This expansion will cause blistering close to the surface which will cause the surface to de-laminate locally from the core. Another problem with such polyurethane based boards is that they absorb moisture up to a level of about 5% calculated on a 100% relative humidity environment. Humidity absorption will cause expansion which leads to de-lamination and possibly warping of such boards.

SUMMARY OF THE INVENTION

The above problems have through the present invention been solved whereby a flexible process for the manufacturing of a mainly isometric and preconditioned core to a decorative laminate has been achieved. Accordingly the invention relates to a process for the manufacturing of a core forming a carrying structure for decorative laminates. The core comprises particles of cured, and optionally foamed, rigid, polyurethane, polyisocyanurate and/or phenolic resin, which particles are bonded to each other in a pressing procedure with a bonding agent comprising an adhesive such as a polymerizing monomer. The invention is characterized in that;

i) The particles are achieved by grinding cured, and optionally foamed, rigid, polyurethane, polyisocyanurate and/or phenolic resin so that it passes through a 2 mm screen, preferably a 1 mm screen.

ii) that 100 parts per weight of particles is mixed with 1–100 parts per weight of fiber, the fiber additive having an average length in the range 1–15 mm.

iii) that the particle-fiber mixture is allowed to absorb a selected amount of water, the amount of water being in the range 1–15% by weight, the water either being added at any stage before the adding of bonding agent, and/or being used as a solvent in the bonding agents and that, iv) 85 parts per weight of the particle mixture is mixed with 2–15 parts per weight of a bonding agent, the bonding agent selected from the group consisting of, a) A mixture of polyols, such as polyester or polyether, crude methylene diphenyl diisocyanate and possibly a small amount of blowing agent in a ratio forming a polymeric resin with a density in the range 600–1400 kg/m$^3$.

b) The bonding agent may also or alternatively consist of a formaldehyde based resin such as phenol-formaldehyde resin, urea-formaldehyde resin, melamine-urea-formaldehyde resin, melamine-urea-phenol-formaldehyde resin or phenol-resorcinol-formaldehyde resin.

c) The bonding agent may also or alternatively consist of polyvinyl acetate resin.

v) The mixture is applied in a continues or static press, possibly with at least one intermediate carrier web, the press allowing a mainly uniform and specified material thickness to form, whereby a slightly porous and preconditioned core with a selected water content in the range 0.8–12% is achieved.

The pressure cycle characteristics are typically in the range; pressure 20–70 MPa, temperature 110° C.–170° C. and a duration of 45 seconds-4 minutes. It is possible to achieve boards with different mechanical properties by altering the pressure cycle characteristics as well as the raw material composition within the scope of the invention. However typical process parameters would suitably be; pressure 50 MPa, temperature 150° C. and a duration of 3 minutes.

A flame retardant comprising halogens such as trichlorophosphate is preferably included in the mixture forming the core.

Suitable isocyanate-reactive compounds to be used in the process of the present invention include any of those known in the art for the preparation of rigid polyurethane or urethane-modified polyisocyanurate foams. Of particular importance for the preparation of rigid foams are polyols and polyol mixtures having average hydroxyl numbers of from 100 to 1000, especially from 100 to 700 mg KOH/g, and hydroxyl functionalities of from 2 to 8, especially from 3 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, sorbitol, sucrose, triethanolamine, 2-hydroxyalkyl-1,3-propanediols, 2-hydroxyalkyl-2-alkyl-1,3-propanediols, 2,2-hydroxyalkyl-1,3-propanediols, 2-hydroxyalkyloxy-1,3-propanediols, 2-hydroxyalkoxy-2-alkyl-1,3-propanediols and 2,2-hydroxyalkoxy-1,3-propanediols, such as trimethylolethane, trimethylolpropane and pentaerythritol, as well as dimers, trimers and polymers thereof; polyamines, for example ethylene diamine, tolylene diamine (TDA), diaminodiphenylmethane (DADPM) and polymethylene polyphenylene polyamines; and aminoalcohols, for example ethanolamine and diethanolamine, and mixtures of such initiators. Other suitable polymeric polyols include polyesters obtained by the condensation of appropriate proportions of glycols and higher functionality polyols with dicarboxylic or polycarboxylic acids. Still further suitable polymeric polyols include hydroxyl terminated polythioethers, polyamides, polyesteramides, polycarbonates, polyacetals, polyolefins, polysiloxanes and starbranched, hyperbranched and dendritic polyester and polyether alcohols.

Suitable organic polyisocyanates for use in the process of the present invention include any of those known in the art for the preparation of rigid polyurethane or urethane-modified polyisocyanurate foams, and in particular the aromatic polyisocyanates such as diphenylmethane diisocyanate in the form of its 2,4', 2,2' and 4,4'isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, toluene diisocyanate in the form of its 2,4 and 2,6isomers and mixtures thereof, 1,5naphthalene diisocyanate and 1,4diisocyanatobenzene. Other organic polyisocyanates which may be mentioned include the aliphatic diisocyanates such as isophorone diisocyanate, 1,6diisocyanatohexane and 4,4'diisocyanatodicyclohexylmethane.

The quantities of the polyisocyanate compositions and the polyfunctional isocyanate-reactive compositions to be reacted will depend upon the nature of the rigid polyurethane or urethane-modified polyisocyanurate foam to be produced and will be readily determined by those skilled in the art.

The water captured in the raw materials (especially de polyols) can be used as blowing agent, when properly monitored. Otherwise, the polyol stream needs to be desiccated before micro-dosing a blowing agent commonly used. Blowing agents proposed in the prior art include hydrochlorofluorocarbons, hydrofluorocarbons and especially hydrocarbons namely alkanes and cycloalkanes such as isobutane, n-pentane, isopentane, cyclopentane and mixtures thereof as well as water or any other carbon dioxide-evolving compounds.

In addition to the polyisocyanate and polyfunctional isocyanate-reactive compositions and the blowing agent mixture, the foam-forming reaction mixture will commonly contain one or more other auxiliaries or additives conventional to formulations for the production of rigid polyurethane and urethane-modified polyisocyanurate foams. Such optional additives include crosslinking agents, for example low molecular weight polyols such as triethanolamine, foam-stabilising agents or surfactants, for example siloxane-oxyalkylene copolymers, urethane catalysts, for example tin compounds such as stannous octoate or dibutyltin dilaurate or tertiary amines such as dimethylcyclohexylamine or triethylene diamine, isocyanurate catalysts, fire retardants, for example halogenated alkyl phosphates such as tris chloropropyl phosphate, colour pigmentation and fillers such as carbon black.

Fibers or other particles is used for adapting the mechanical properties of the core material. These type of additives can be used for a number of reasons. Additives may be used to alter adjust or improve acoustic properties, density, thermal coefficient of expansion, thermal conductivity, flexibility, rigidity and brittleness. A proper filler may also reduce the manufacturing costs. Typical particle fillers are minerals such as mica and lime, while common fiber fillers are glass, carbon, steel, aramide and cellulose fibers. The fiber is suitably blended with the particles during the grinding operation. The fiber added is suitably selected from the group; cellulose fiber, glass fiber, carbon fiber and aramide fiber.

DETAILED DESCRIPTION OF THE PREFERRED EMBODIMENTS

According to one embodiment of the invention the core is provided with a decorative upper surface after the manufacturing of the core.

According to another embodiment the core is provided with a decorative upper surface during the manufacturing of the core.

According to one embodiment of the invention the first surface webs, constituting a decorative upper surface, is manufactured by laminating at least one uppermost so-called overlay web of melamine-formaldehyde resin impregnated α-cellulose paper with at least one decorative web of decorated melamine-formaldehyde resin impregnated α-cellulose paper and possibly a group of support webs under heat and pressure so that the resin cures at least partially and the webs are bonded to one another, preferably while the polyurethane core is formed. The support layer webs are suitably forming a part of the decorative upper surface. The group of support layer webs comprises one or more monochromatic webs of α-cellulose impregnated with melamine-formaldehyde resin and/or one or more Kraft-paper webs impregnated with phenol-formaldehyde resin, urea-formaldehyde resin, melamine-formaldehyde resin or combinations thereof. In order to improve the abrasion resistance, the overlay webs and optionally the decorative paper webs preferably includes 2–100 g/m$^2$ per layer of hard particles of α-aluminum oxide, silicon carbide or silicon oxide having an average particle size in the range 50 nm–150 μm. The upper surface of the uppermost overlay web suitably contains 2–100 g/m$^2$ of hard particles of α-aluminum oxide, silicon carbide or silicon oxide having an average particle size in the range 50 nm–30 μm. This will improve the scratch resistance.

In cases where a an upper surface with very high demands is needed, the decorative upper surface is suitably laminated and at least partially cured prior to the part of the process where the core is achieved and bonded to the decorative upper surface.

In processes where the upper surfaces are bonded to each other at the same time as the core is formed, the pressure in the belt press is suitably increased towards the end of pressing cycle.

According to another embodiment of the invention the first surface web is constituted by a printed foil. The printed foil is suitably made of α-cellulose impregnated with a polymeric lacquer or resin such as melamine-formaldehyde, urea-formaldehyde acrylic, maleamid, polyurethane or the like. The printed foil may alternatively be made of a polymer such as polyvinyl-chloride, polyester, polypropylene, polyethylene, polyurethane, acrylic or the like. The upper surface is suitably coated with one or more wear-resistant layers of acrylic or maleamid lacquer on top of the printed foil after having passed through the continuos belt press. The lacquer is preferably of an UV- or electron-beam curing type and is suitably applied in two or more layers with intermediate stages of partial or complete curing. In order to improve the abrasion resistance the lacquer preferably includes 2–100 g/m$^2$ per layer of hard particles of α-aluminum oxide, silicon carbide or silicon oxide having an average particle size in the range 50 nm–150 μm. The scratch resistance may be improved by applying 2–100 g/m$^2$ of hard particles of α-aluminum oxide, silicon carbide or silicon oxide having an average particle size in the range 50 nm–30 μm on the upper surface of the uppermost layer of lacquer.

According to yet another embodiment of the invention the first surface web is constituted by a translucent or semi-translucent layer. The particles of the core are suitably deviating in color from the polymeric resin, which resin suitably also comprises pigmentation. The semi-translucent layer is preferably constituted of a foil or a web which is provided with a printed décor which décor preferably is semi-translucent or opaque, covering only parts of the surface of the foil or web. The semi-translucent foil or web is preferably constituted of α-cellulose impregnated with a polymeric resin or lacquer such as melamine-formaldehyde, urea-formaldehyde, polyurethane, acrylic or meleimide. The semi-translucent foil or web is alternatively constituted of a polymer such as polyvinyl-chloride acrylic, polyester, polypropylene, polyethylene, polyurethane or the like. A wear layer, or a number of wear layers are preferably applied on top of the foil or web. The wear layers are suitably constituted of α-cellulose impregnated with a polymeric resin or lacquer such as melamine-formaldehyde, urea-formaldehyde, polyurethane, acrylic or maleamid. The wear layers are alternatively constituted of a lacquer such as acrylic or meleimide, possibly of a UV or electron-beam curing type. Such a lacquer is preferably applied in two or more layers with intemediate stages of partial or complete curing.

In order to improve abrasion resistance, the wear layer suitably includes 2–100 g/m$^2$ per layer of hard particles of α-aluminum oxide, silicon carbide or silicon oxide having an average particle size in the range 50 nm–150 μm. The scratch resistance can suitably be improved by applying 2–100 g/m$^2$ of hard particles of α-aluminum oxide, silicon carbide or silicon oxide having an average particle size in the range 50 nm–30 μm on the upper surface of the uppermost layer of lacquer.

According to yet another embodiment of the invention a décor is applied on the upper side of the first surface web or the upper side of the core. The décor is, according to the embodiment, printed directly on the surface or applied on the surface via transfer printing, possibly after having sanded and/or coated the surface of the core. A wear layer or a number of wear layers are suitably applied on top of the décor. The wear layers are here suitably constituted of α-cellulose impregnated with a polymeric resin or lacquer such as melamine-formaldehyde, urea-formaldehyde, polyurethane, acrylic or maleamid. The wear layers are alternatively constituted of a lacquer such as acrylic or meleimide, possibly of a UV or electron-beam curing type. Such a lacquer is suitably applied in two or more layers with intermediate stages of partial or complete curing. In order to improve the abrasion resistance the wear layer preferably includes 2–100 g/m$^2$ per layer of hard particles of α-aluminum oxide, silicon carbide or silicon oxide having an average particle size in the range 50 nm–150 μm. The scratch resistance is preferably improved by applying 2–100 g/m$^2$ of hard particles of α-aluminum oxide, silicon carbide or silicon oxide having an average particle size in the range 50 nm–30 μm on the upper surface of the uppermost layer of lacquer.

The invention also relates to a decorative laminate achieved through the process, the decorative laminate comprising a core, at least an upper abrasion resistant decorative layer, and edges provided with means for joining. The core comprises particles of cured, and optionally foamed and rigid material selected from the group consisting of; polyurethane, polyisocyanurate and/or phenolic resin. The core furthermore comprises fiber. The particles and additive are bonded to each other in a pressing procedure with a bonding agent comprising an adhesive such as a polymerizing monomer. The invention is characterized in that;
i) The particles of the core are constituted of grinded, optionally foamed, rigid, polyurethane, polyisocyanurate and/or phenolic resin smaller than 2 mm, preferably 1 mm, most preferably with a size partition of below 5% of particles larger than 1 mm, 25%–75% of particles larger than 0.5 mm and 25–75% of particles smaller than 0.5 mm. The fiber additive is present to an amount in the range 1–50% by weight. The fiber has an average length in the range 1–15 mm,
ii) The core comprises 85 parts per weight of particles and 2–15 parts per weight of a bonding agent, the bonding agent selected from the group consisting of;
   a) A mixture of polyols, such as polyester or polyether, crude methylene diphenyl diisocyanate and possibly a small amount of blowing agent in a ratio forming a polymeric resin with a density in the range 600–1400 kg/m$^3$.
   b) A phenolic resin such as phenol-formaldehyde resin, urea-formaldehyde resin or mixtures thereof.
   c) A polyvinyl acetate resin.
iii) The core is also preconditioned to a moisture content in the range 0.8–12%.

I claim:
1. A process for the manufacturing of a core forming a carrying structure for decorative laminates, the core comprises particles of cured resin, the particles being bonded to each other in a pressing procedure with a bonding agent, wherein;
   i) the particles are achieved by grinding cured resin so that it passes through a 2 mm screen,
   ii) mixing 100 parts per weight of particles with 1–100 parts per weight of fiber, the fiber additive having an average length in the range 1–15 mm.
   iii) allowing the particle-fiber mixture to absorb a selected amount of water, the amount of water being in the range 1–15% by weight, the water either being added at any stage before the adding of bonding agent, and/or being used as a solvent in the bonding agent, and that, iv) mixing 85 parts per weight of the particle-fiber mixture with 2–15 parts per weight of a bonding agent, the bonding agent selected from the group consisting of,
   a) a mixture of polyols, crude methylene diphenyl disocyanate and possibly a small amount of blowing agent in a ratio forming a polymeric resin with a density in the range 600–1400 kgm/$^3$;
   b) a formaldehyde resin; and
   c) polyvinyl acetate resin, and that,
v) applying the mixture between the belts of the continuous belt press or the press plates of a static press, the belts or press plates allowing a mainly uniform and specified material thickness to form, whereby a slightly porous and preconditioned core with a selected water content in the range 0.8–12% is achieved.

2. A process according to claim 1, wherein the fiber is blended with the particles during the grinding operation.

3. A process according to claim 1, wherein the fiber is selected from the group consisting of cellulose fiber, glass fiber, carbon fiber and aramide fiber.

4. A process according to claim 2, wherein the fiber is selected from the group consisting of cellulose fiber, glass fiber, carbon fiber and aramide fiber.

5. A process according to claim 1, wherein a flame retardant comprising a halogen is included in the mixture forming the core.

6. A process according to claim 1, wherein the core is provided with a decorative upper surface after the manufacturing of the core.

7. A process according to claim 1, wherein the core is provided with a decorative upper surface during the manufacturing of the core.

8. A process according to claim 6, wherein a decorative upper surface is manufactured by laminating at least one uppermost overlay web of melamine-formaldehyde resin impregnated α-cellulose paper with at least one decorative web of decorated melamine-formaldehyde resin impregnated α-cellulose paper under heat and pressure so that the resin cures at least partially and the webs are bonded to one another.

9. A process according to claim 8, wherein a part of the decorative upper surface support layer webs, said support layer webs comprise one or more monochromatic webs of α-cellulose impregnated with melamine-formaldehyde resin and/or one or more Kraft-paper webs impregnated with phenol-formaldehyde resin, urea-formaldehyde resin, melamine-formaldehyde resin or combinations thereof.

10. A process according to claim 8, wherein the overlay webs and optionally the decorative paper webs include 2–100 g/m$^2$ per layer of hard particles of α-aluminum oxide, silicon carbide or silicon oxide having an average particle size in the range 50 nm–150 μm.

11. A process according to claim 10, wherein the upper surface of the uppermost overlay web contains 2–100 g/m$^2$ of hard particles of α-aluminum oxide, silicon carbide or silicon oxide having an average particle size in the range 50 nm–30 μm.

12. A process according to claim 8, wherein the decorative upper surface is laminated and at least partially cured prior to bonding the decorative upper surface to the core.

13. A process according to claim 9, wherein the pressure in the belt press is increased towards the end of pressing cycle.

14. A process according to claim 6, wherein the first surface web is constituted by a printed foil.

15. A process according to claim 14, wherein the printed foil is made of α-cellulose impregnated with a polymeric lacquer or resin selected from the group consisting of melamine-formaldehyde, urea-formaldehyde acrylic, maleamid and polyurethane.

16. A process according to claim 14, wherein the printed foil is made of a polymer selected from the group; polyvinylchloride, polyester, polypropylene, polyethylene, polyurethane and acrylic.

17. A process according to claim 15, wherein the upper surface is coated with one or more wear-resistant layers of acrylic or maleamid lacquer on top of the printed foil after having passed through the continuous belt press.

18. A process according to claim 17, wherein the lacquer is of an UV- or electron-beam curing type.

19. A process according to claim 18, wherein the lacquer is applied in two or more layers with intermediate stages of partial or complete curing.

20. A process according to claim 18, wherein the lacquer includes 2–100 g/m$^2$ per layer of hard particles of α-aluminum oxide, silicon carbide or silicon oxide having an average particle size in the range 50 nm–15 μm.

21. A process according to claim 20, wherein the upper surface of the uppermost layer of lacquer contains 2–100 g/m$^2$ of hard particles of α-aluminum oxide, silicon carbide or silicon oxide having an average particle size in the range 50 nm–30 μm.

22. A process according to claim 6, wherein the first surface web is constituted by a translucent or semi-translucent layer.

23. A process according to claim 22, wherein the particles of the core are deviating in color from the polymeric resin.

24. A process according to claim 23, wherein the polymeric resin also comprises pigmentation.

25. A process according to claim 22, wherein the semi-translucent layer is constituted of a foil or a web which is provided with a printed décor.

26. A process according to claim 25, wherein the printed decor is semi-translucent.

27. A process according to claim 25, wherein the printed decor is opaque, covering only parts of the surface of the foil or web.

28. A process according to claim 25, wherein the semi-translucent foil or web is constituted of α-cellulose impregnated with a polymeric resin or lacquer selected from the group consisting of melamine-formaldehyde, urea-formaldehyde, polyurethane, acrylic and maleamide.

29. A process according to claim 25, wherein the semi-translucent foil or web is constituted of a polymer selected from the group consisting of polyvinyl chloride acrylic, polyester, polypropylene, polyethylene and polyurethane.

30. A process according to claim 29, wherein a wear layer or a number of wear layers are applied on top of the foil or web.

31. A process according to claim 30, wherein the wear layers are constituted of α-cellulose impregnated with a polymeric resin or lacquer selected from the group consisting of melamine-formaldehyde, urea-formaldehyde, polyurethane, acrylic and meleimide.

32. A process according to claim 30, wherein the wear layers are constituted of a lacquer selected from the group consisting of acrylic and meleimide, optionally a UV or electron-beam curing type.

33. A process according to claim 32, wherein the lacquer is applied in two or more layers with intermediate stages of partial or complete curing.

34. A process according to claim 30, wherein the wear layer includes 2–100 g/m$^2$ per layer of hard particles of α-aluminum oxide, silicon carbide or silicon oxide having an average particle size in the range 50 nm–150 μm.

35. A process according to claim 34, wherein the upper surface of the uppermost wear layer contains 2–100 g/m² of hard particles of α-aluminum oxide, silicon carbide or silicon oxide having an average particle size in the range 50 nm–30 μm.

36. A process according to claim 6, wherein a décor is applied on the upper side of the first surface web or the upper side of the core and that the décor is printed directly on the surface or applied on the surface via transfer printing, possibly after having sanded and/or coated the surface of the core.

37. A process according to claim 36, wherein a wear layer or a number of wear layers are applied on top of the decor.

38. A process according to claim 37, wherein the wear layers are constituted of α-cellulose impregnated with a polymeric resin or lacquer selected from the group consisting of melamine-formaldehyde, urea-formaldehyde, polyurethane, acrylic and maleamid.

39. A process according to claim 37, wherein the wear layers are constituted of a lacquer selected from the group consisting of acrylic and meleimide.

40. A process according to claim 28, wherein the lacquer is applied in two or more layers with intermediate stages of partial or complete curing.

41. A process according to claim 40, wherein the wear layer includes 2–100 g/m² per layer of hard particles of α-aluminum oxide, silicon carbide or silicon oxide having an average particle size in the range 50 nm–150 μm.

42. A process according to claim 40, wherein the upper surface of the uppermost wear layer contains 2–100 g/m² of hard particles of α-aluminum oxide, silicon carbide or silicon oxide having an average particle size in the range 50 nm–30 μm.

43. The process of claim 1, wherein the particles are at least one selected from the group consisting of foamed or rigid polyurethane, polyisocyante and phenolic resin.

44. The process according to claim 1, wherein the particles pass through a 1 mm screen.

45. The process according to claim 1, wherein the polyol is selected from the group consisting of polyester, and polether.

46. The process according to claim 1, wherein the formaldehyde resin is one selected from the group consisting of phenyl-formaldehyde resin, urea-formaldehyde resin, melamine-urea-formaldehyde resin, melamine-urea-phenol-formaldehyde resin and phenol-resorcinol-formaldehyde resin.

47. The process of claim 1, wherein the step of applying the mixture between the belts of a continuous press belt or the press plates of a static press further include applying at least one intermediate carrier web.

48. The process according to claim 39, wherein the acrylic or melemide lacquer is a UV or electron-beam curing type.

49. The process according to claim 10, further comprising decorative paper webs including 2–100 g/m² of hard particles selected from the group consisting of α-aluminum oxide, silicon carbide and silicon oxide having average particle size in the range 50 nm–150 μm.

50. The process according to claim 36, further comprising sanding the surface of the core prior to printing of the décor on the core.

51. The process according to claim 36, further comprising coating the surface of the core before printing the décor directly on the core.

* * * * *